United States Patent [19]
Haudebert et al.

[11] Patent Number: 5,854,429
[45] Date of Patent: Dec. 29, 1998

[54] MAGNETIC PROTECTION DEVICE

[75] Inventors: Lionel Haudebert, Macon; Marcel Freund, Griéges, both of France

[73] Assignee: Schlumberger Industries, S.A., Montrouge, France

[21] Appl. No.: 793,790

[22] PCT Filed: Aug. 4, 1995

[86] PCT No.: PCT/FR95/01052

§ 371 Date: Jun. 9, 1997

§ 102(e) Date: Jun. 9, 1997

[87] PCT Pub. No.: WO96/06480

PCT Pub. Date: Feb. 29, 1996

[30] Foreign Application Priority Data

Aug. 23, 1994 [FR] France .................................. 94 10200

[51] Int. Cl.⁶ .................................................. G01N 1/58
[52] U.S. Cl. ..................................... 73/861.13; 73/861.08
[58] Field of Search ........................... 73/861.08, 861.13, 73/861.94, 258; 310/75 D, 103

[56] References Cited

U.S. PATENT DOCUMENTS

| | | | |
|---|---|---|---|
| 3,631,718 | 1/1972 | Sato ..................................... | 73/861.13 |
| 3,835,706 | 9/1974 | Varga ....................................... | 73/254 |
| 3,949,606 | 4/1976 | Blancett .................................. | 73/258 |
| 3,994,168 | 11/1976 | Varga ....................................... | 73/258 |
| 4,253,341 | 3/1981 | Ikeda et al. ........................... | 73/861.77 |
| 5,691,586 | 11/1997 | Yonnet et al. ......................... | 310/75 D |

*Primary Examiner*—Max H. Hoon
*Attorney, Agent, or Firm*—Leonard W. Pojunas

[57] ABSTRACT

A protection device (70) for providing a drive system (60) for imparting rotary drive between two mechanical members (28, 44) about an axis by magnetic coupling with protection from an external magnetic field, said drive system including at least two axially magnetized elements (62a, 62b, 64a, 64b) each secured to at least one of said mechanical members and designed to interact with one another, said magnetized elements being axially offset, said protection device comprising two parts (72, 74; 92, 94; 96, 98) of magnetic material surrounding said drive system, each of said parts having a minimum radial extent greater than the radial extent of said magnetized elements, the protection device being characterized in that the two parts (72, 74; 92, 94; 96, 98) of magnetic material leave between them an axial space (76) so as to reduce the gradient of the external magnetic field at the drive system, and have an axial extent such that they encompass said drive system axially.

4 Claims, 6 Drawing Sheets

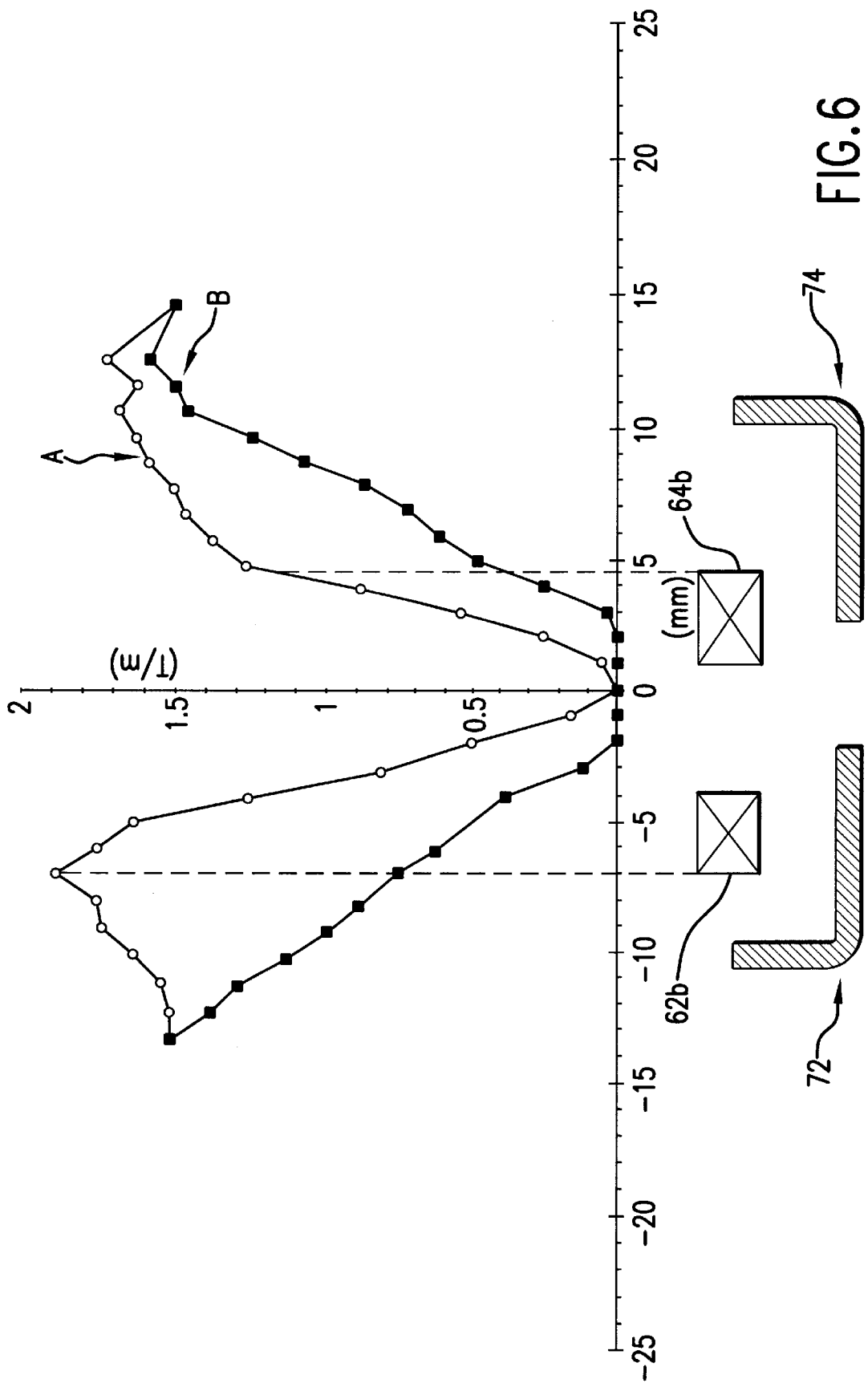

MAGNETIC PROTECTION DEVICE

The present invention relates to a device for providing protection against an external magnetic filed to a system for conveying rotary drive about an axis between two mechanical members that are coupled together magnetically.

Systems are already known for conveying rotary drive about an axis between two mechanical members by magnetic coupling, such systems comprising at least two magnetized elements, each secured to a respective one of said mechanical member. One of the magnetic elements constitutes the driving portion of the system while the other magnetic constitutes the driven portion thereof. The magnetic elements are magnetized axially and they are designed to interact with each other so that rotation imparted to one of the mechanical members is transmitted to the other mechanical member via the above-described drive system.

The Applicant has observed that when such systems providing drive by magnetic coupling are in the presence of a magnetic field, and more particularly of a magnetic field gradient, such drive systems can be disturbed and, for example, loss of magnetic synchronization can be observed between the driving portion and the driven portion of the drive system.

For example, in the field of fluid metering and as shown in FIG. 1, it is known from Brazilian utility model 91BR-100684 to provide a magnetic protection device 1 which surrounds a drive system 2 making use of magnetic coupling in a water meter.

The drive system comprises two axially magnetized rings 3 and 5 disposed facing each other along a geometrical axis coinciding with the axis of a spinner 7 and of a shaft 9 connected to a totalizing counter. The protection device comprises two parts 11 and 13 of magnetic material that are symmetrical about the horizontal midplane P passing between the magnetized rings 3, 5. As shown in FIG. 2, each of the parts 11 and 13 has two cylindrical wall portions 11a & 11b or 13a & 13b extending parallel to the geometrical axis over the same axial extent or height, and the walls are connected together in pairs at their axially remote edges vial respective third web portions 11c and 13c that are annular and that extend radially, thereby causing each piece to be U-shaped in a section that contains the geometrical axis.

The protection device 1 is obtained by uniting the two pieces made of magnetic material, thereby giving said device the form of a torus of approximately rectangular section.

When the magnetic protection device 1 is installed in the water meter, it is placed around the two magnetized rings 3 and 5 and its axial extent or height corresponds to that of the magnetic drive system.

Such a protection device channels field lines from a magnetic field external to the water meter, and as a result the external magnetic field is greatly reduced in the zone inside the parts 11 and 13 made of magnetic material and within which the magnetized rings 3 and 5 are situated.

Nevertheless, the Applicant has observed that in the presence of an external magnetic field, a magnetic field gradient is set up in the vicinity of the axial ends of the zone inside the parts 11 and 13 in which the rings 3 and 5 are situated, and that this gradient can hinder operation of the drive system making use of magnetic coupling.

The Applicant has also observed that by increasing the inside diameter of the parts 11 and 13, the above-specified zone in which the magnetic field due to the external magnetic field is substantially zero is itself reduced. The effectiveness of such a protection device therefore relies on its proximity relative to the magnetized rings. In certain types of meter, such proximity can give rise to magnetic interactions between the magnetized rings and the parts made of magnetic material.

The present invention seeks to remedy the drawbacks of the prior art by means of a device for providing a system for conveying rotary drive about an axis between two mechanical members by magnetic coupling with protection against a magnetic field external thereto, which device is simple to implement and makes it possible to reduce said magnetic field gradient at said drive system.

The invention thus provides a protection device for providing a drive system for imparting rotary drive between two mechanical members about an axis by magnetic coupling with protection from an external magnetic field, said drive system including at least two axially magnetized elements each secured to at least one of said mechanical members and designed to interact with one another, said magnetized elements being axially offset, said protection device comprising two parts of magnetic material surrounding said drive system, each of said parts having a minimum radial extent greater than the radial extent of said magnetized elements, the protection device being characterized in that the two parts of magnetic material leave between them an axial space so as to reduce the gradient of the external magnetic field at the drive system, and have an axial extent such that they encompass said drive system axially.

This characteristic makes it possible not only to reduce the intensity of the external magnetic field at the drive system, but also to make the field as uniform as possible in the zone where the magnetic coupling drive system is situated.

This protection device also makes it possible to limit leakage of the magnetic field created by the magnetic coupling drive system.

According to a characteristic of the invention, the parts made of magnetic material are situated at a distance from the magnetized elements of the drive system such that the magnetized elements create a magnetic field at said parts of an intensity that is less than $10^{-3}$ Teslas.

Nevertheless, certain types of meter, in particular meters of volume-related quantities can accept greater levels of magnetic interaction between the magnetic protection device and the drive system.

This character is particularly advantageous in water meters where it makes it possible to make all magnetic interaction between the protection device and the drive system negligible. Each piece made of magnetic material is circularly symmetrical about the axis.

According to the other characteristics of the invention:

- at least one of the parts made of magnetic material is in the form of a hemispherical ring;
- at least one of the parts of magnetic material includes both an axially-extending first portion that is cylindrical in shape, and a second portion that is annular in shape, extending radially towards the drive system from that one of the axial ends of the first portion which is further from the axial space;
- at least one of the parts of magnetic material comprises two parallel cylindrical portions extending axially together with a radially annular third portion uniting said cylindrical portions via that one of their respective ends that is further from the axial space;
- the two parts made of magnetic material are different from each other;

the two parts made of magnetic material are identical;

the magnetic coupling drive system is of the attractive type;

the magnetic coupling drive system (60) is of the repulsive type; and the magnetic coupling drive system includes two pairs of permanent magnets constituting the magnetized elements.

The invention also provides a fluid meter comprising a measurement chamber and an enclosure containing a totalizing counter separating by at least one wall make of non-magnetic material, an axial spinner situated in said measurement chamber being immersed in said fluid, and a shaft in coaxial alignment with said spinner and mechanically connected to said totalizing counter, a rotary drive system magnetically coupling together the axial spinner and the shaft of the counter and comprising at least two axially magnetized elements secured respectively to said axial spinner and to said shaft of the totalizing counter, said fluid meter including a protection device for protecting said drive system against an external magnetic field. A fluid meter fitted with such a protection device is particularly advantageous since firstly it makes it possible to prevent an external magnetic field braking the spinner at low fluid flow rates, and secondly it ensures that uncoupling does not take place at high fluid flow rates.

In a first embodiment of the invention, the fluid meter also includes an additional wall co-operating with the wall in contact with the enclosure to define an additional chamber disposed between the enclosure and the measurement chamber and in which the two pieces made of magnetic material of the device of the invention are situated.

In a second embodiment of the invention, the fluid meter also includes an additional wall which co-operates with the wall in contact with the enclosure to define an additional chamber disposed between the enclosure and the measurement chamber, and the two parts made of magnetic material are separated from each other by the wall in contact with the enclosure, thereby making it possible to reduce overall size relative to the first embodiment of the protection device.

In a third embodiment of the invention, the fluid meter also includes an additional wall which co-operates with the wall in contact with the enclosure to define an additional chamber disposed between the enclosure and the measurement chamber, and the two parts made of magnetic material are separated from each other by the additional wall. Advantageously, this configuration and that of the first embodiment make it possible while installing the magnetic protection device of the invention to avoid interfering with the installation of the various portions of the totalizing counter.

In a fourth embodiment of the invention, the fluid meter also includes an additional wall which co-operates with the wall in contact with the enclosure to define an additional chamber disposed between the enclosure and the measurement chamber, and the two parts made of magnetic material are separated from each other by both walls. This makes it possible to reduce the axial size of the additional chamber very greatly so as to obtain small overall size.

In a fifth embodiment of the invention, a single wall is provided in the meter to separate the enclosure containing the totalizing counter from the measurement chamber, and the two parts made of magnetic material of the protection device are separated from each other solely by said wall. Thus, one of the parts made of magnetic material is situated in the measurement chamber of the fluid meter.

It should be observed that the fluid protection device of the invention may also be applied to a water meter in which the flow sensor is not a spinner.

Other characteristics and advantages appear from the following description given solely by way of non-limiting example and made with reference to the accompanying drawings, in which.

Figure 1:
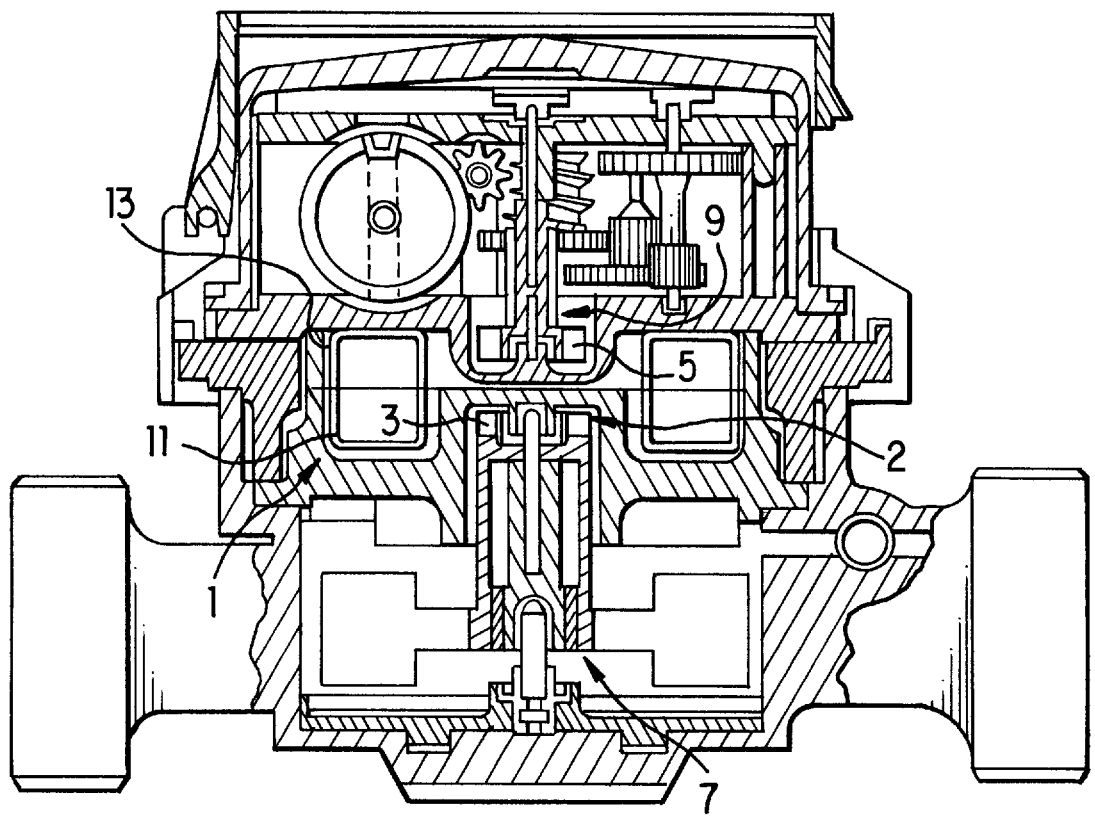
FIG. 1 is a diagrammatic longitudinal section view through a water meter fitted with a magnetic protection device of the prior art.
Figure 2:
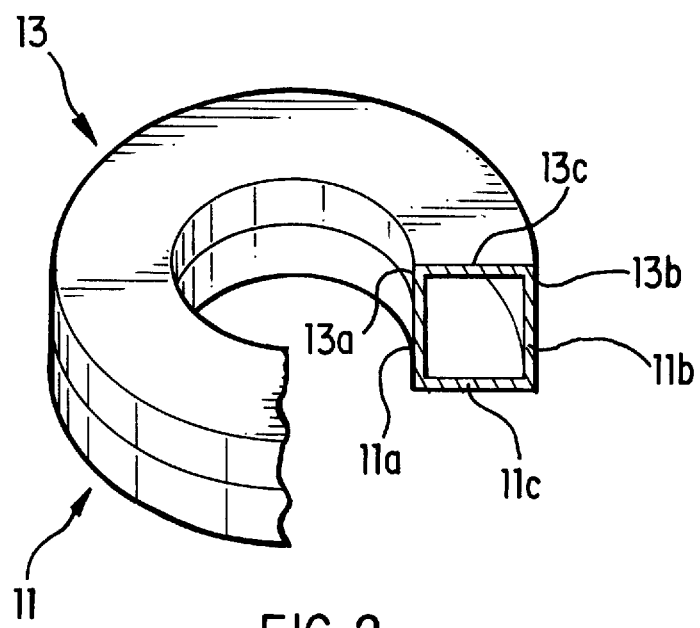
FIG. 2 is a fragmentary diagrammatic perspective view of the magnetic protection device shown in FIG. 1.
Figure 5:
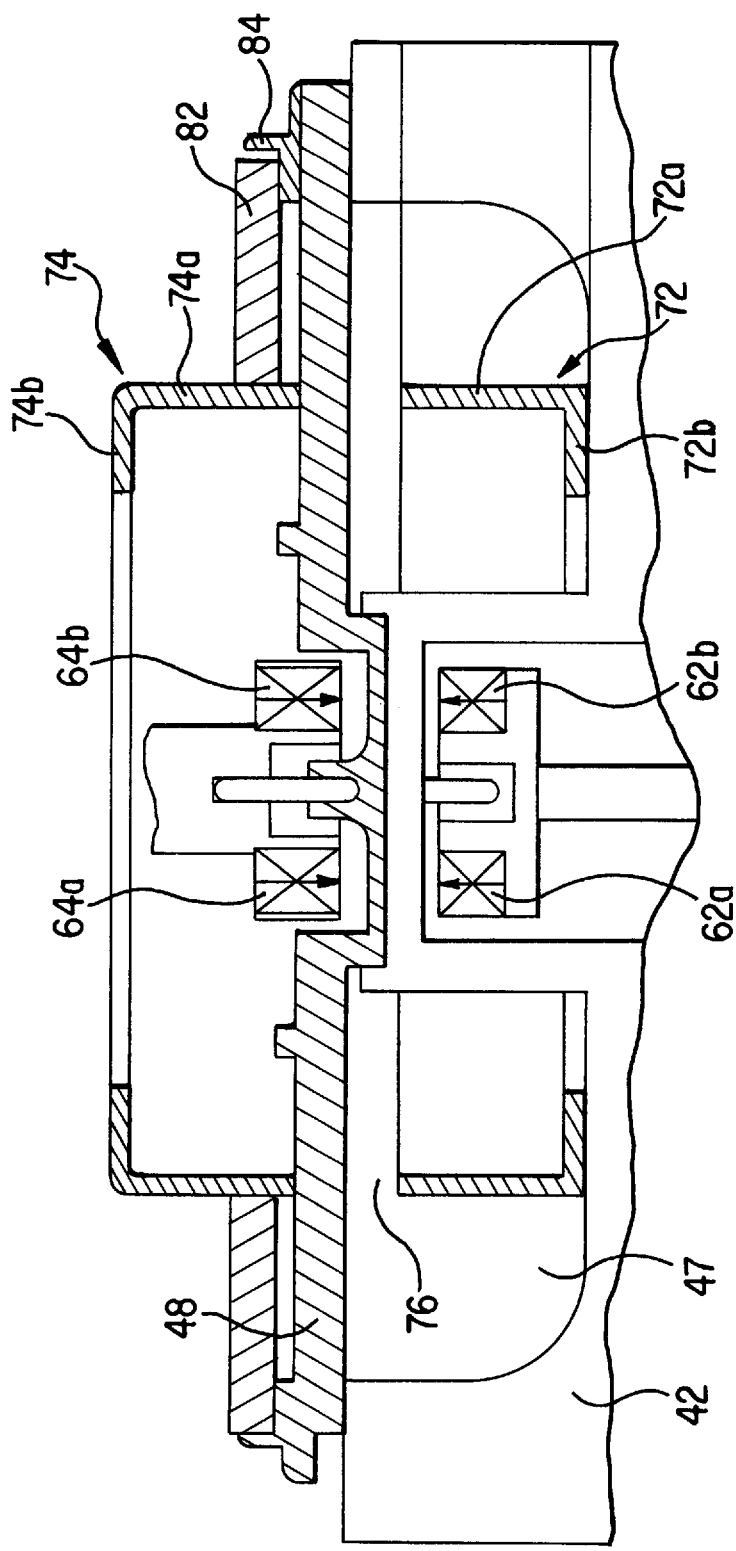
FIG. 5 is a fragmentary diagrammatic view of a water meter fitted with a magnetic protection device constituting a second embodiment of the invention.
Figure 7A:
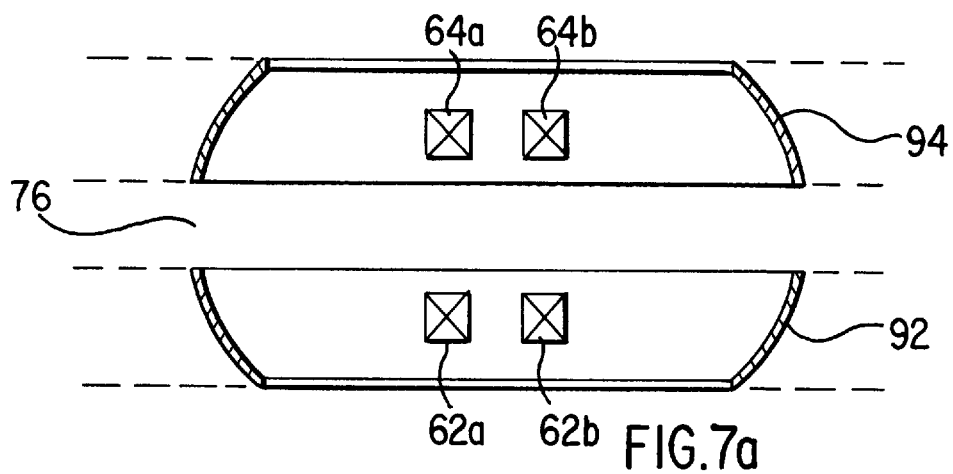
Figure 7B:
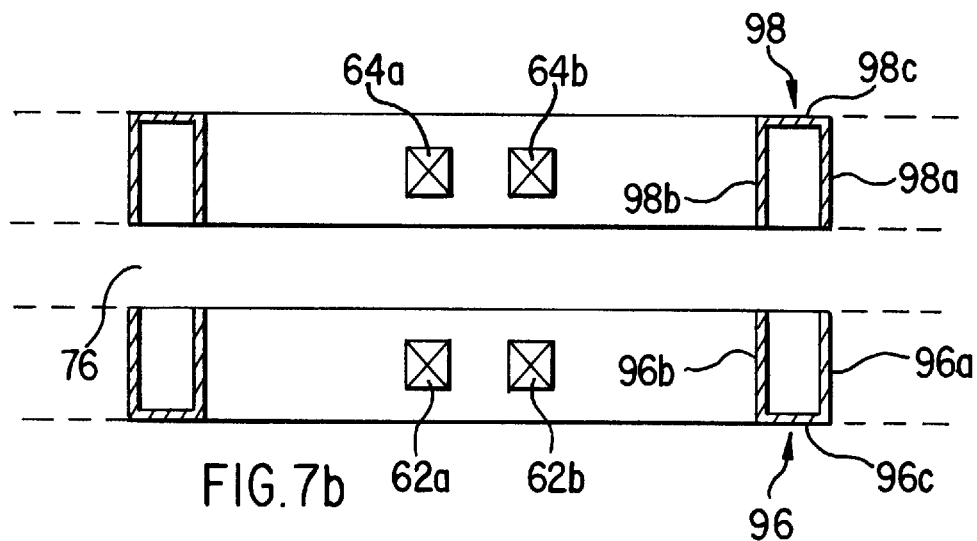
Figure 7C:
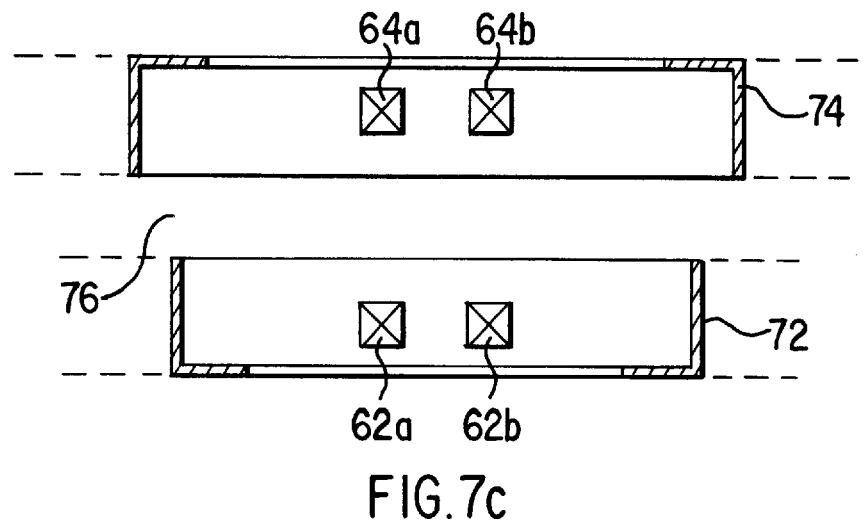

FIG. 6 is a graph with two curves showing the appearance of the magnetic field gradient at the magnetic coupling drive system in the presence of an external magnetic field, respectively for the magnetic protection device shown in FIGS. 1 and 2 (curve A) and for the device shown in FIG. 5 (curve B); and FIGS. 7a to 7c are fragmentary diagrammatic views of variants of the magnetic protection device shown in FIG. 5.

Figure 3:
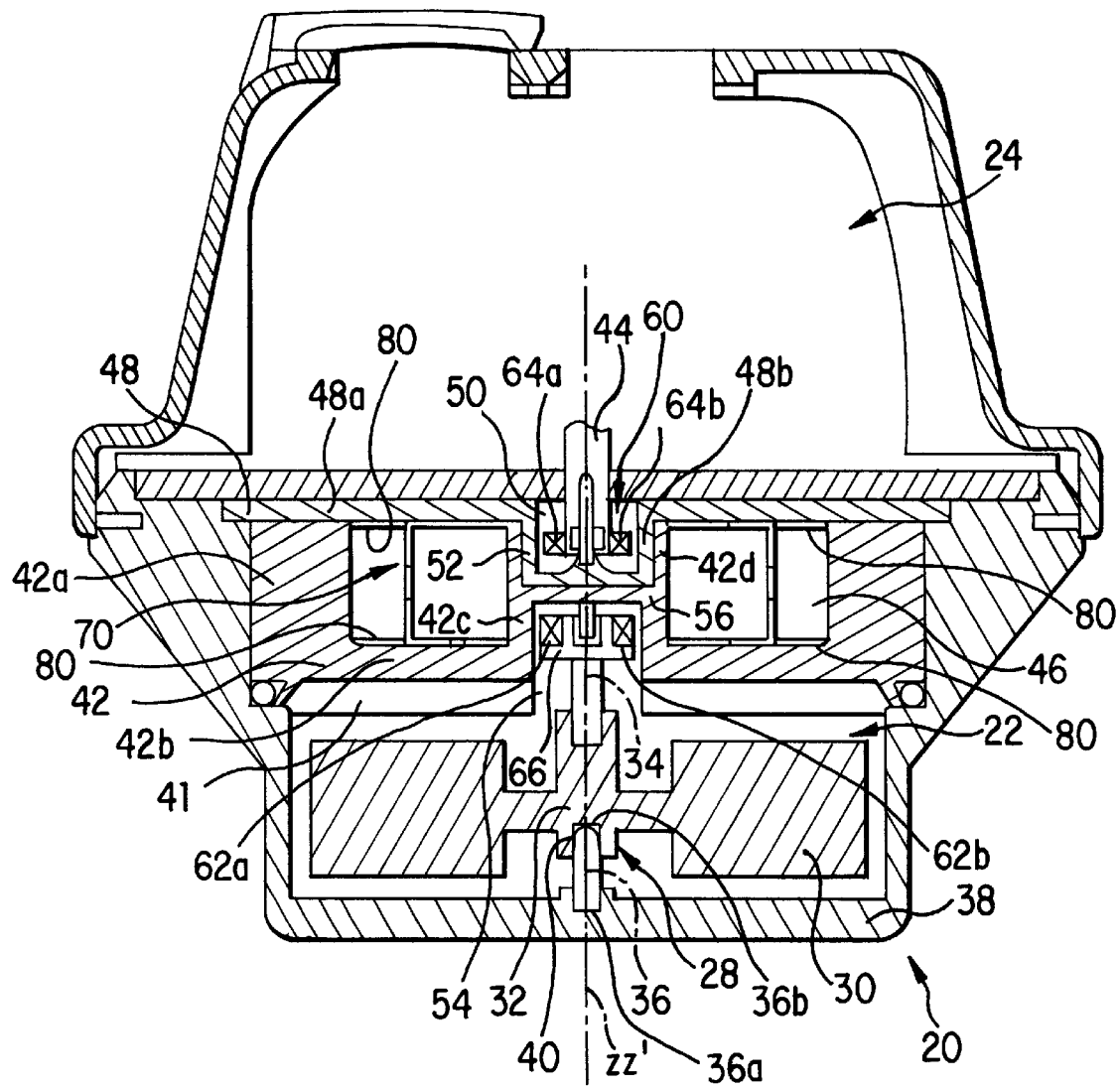
FIG. 3 is a diagrammatic longitudinal section view through a meter fitted with a magnetic protection device constituting a first embodiment of the invention.

There follows a description of a fluid meter, more particularly a water meter as shown in FIG. 3 and given overall reference 20, which meter includes a drive system that makes use of magnetic coupling plus a magnetic protection device of the invention for protecting such a drive system from an external magnetic field.

The water meter includes a measurement chamber 22 and an enclosure 24 disposed thereabove and containing a totalizing counter, e.g. a mechanical counter (not shown).

The water meter also includes two mechanical members in alignment on a vertical axis ZZ' and suitable for rotating about said axis. One of the mechanical members is an axial spinner 28 provides with blades 30 and disposed in the measurement chamber 22. The axial spinner 28 comprises firstly a central hub 32 on which the blades 30 are secured, and secondly a shaft 34 at its top end which is coaxial with said hub and with the axis of the spinner, and which is secured to said hub. The axial spinner 28 rests on a pivot 36 having one of its ends (its "bottom" end 36a) held by one of the walls of the measurement chamber extending perpendicularly to said axis, and constituting the bottom 38 of the chamber. An axial housing 40 is provided in the central hub 32 of the spinner in order to receive the top end 36b of the pivot 36. The top end of the pivot 36b is in contact with the bottom of the axial housing 40 when the spinner is at rest.

The measurement chamber 22 includes baffles 41 or ribs disposed radially relative to the axis of the spinner and secured to the top wall 42 of said chamber which extends perpendicularly to the axis ZZ' and which faces the bottom 38. This top wall 42 or table, provides sealing between the measurement chamber and the enclosure 24 and against the outside atmosphere, and it is made of a non-magnetic material.

Water penetrates into the measurement camber via an injector and it leaves it via an ejector, the injector and the ejector not being visible in the section plane of FIG. 3. When the spinner 28 is caused to rotate because of water flowing through the measurement chamber, the spinner rises and the bottom of the axial housing 40 moves away from the top end 36b of the pivot 36.

The other mechanical element is a shaft 44 in alignment with the axis of the spinner 28 and situated within the enclosure 24 of the totalizing counter.

The water meter includes an additional chamber 46 disposed between the enclosure 24 containing the totalizing counter and the measurement chamber 22. The additional chamber 46 is defined by two walls, one of the walls coinciding with the top wall 42 of the measurement chamber while its other wall 48 or "base" is situated above said wall 42. This wall 48 is made of non-magnetic material and separates the enclosure 24 from the additional chamber 46. The wall 48 has a first horizontal outer peripheral zone 48a and a central second zone 48b that is deformed towards the measurement chamber 22 so as to form a recess 50 adjacent the enclosure 24, and a projecting portion 52 in the opposite direction.

The top wall 42 has a first peripherally outer zone 42a forming an annular flange which extends parallel to the axis of the spinner and which is placed against a first portion of the first zone 48a of the wall 48, which portion is the most remote from the second zone 48b.

The top wall 42 has a horizontal second zone 42b in the form of a ring co-operating with the facing second portion of the first zone 48a of the wall 48 to confer an annular shape to the additional chamber 46.

The top wall 42 also has a third zone 42c which is deformed towards the enclosure 24 so as to form a housing 54 adjacent the measurement chamber, and a projecting portion 56 extending in the opposite direction. The projecting portions 52 and 56 respectively of the second zone 48b of the wall 48 and of the third zone 42c of the upper wall 42 come into contact with each other, and said third zone 42c includes a peripheral collar 42d that surrounds said projecting portion 56 of the second zone 48b of the wall 48.

The water meter also includes a magnetic coupling drive system 60 which serves to transmit rotary motion from the axial spinner 28 to the shaft 44 which then transmits said motion mechanically to the totalizing counter.

As shown in FIG. 3, the magnetic coupling drive system 60 comprises at least two elements that are magnetized in an axial direction parallel to the axis ZZ'. One of these magnetized elements is secured to the shaft 44 and another to the axial spinner 28.

The magnetic coupling system 60 is constituted, for example, by two pairs of permanent magnets 62a & 62b and 64a & 64b of rectangular parallelepiped shape. Each pair is spaced around a ring centered on the axis ZZ' and the two magnets constituting each pair are diametrically opposite about the center of the ring. By way of example, the permanent magnets may be identical.

As shown in FIG. 3, the shaft 34 secured to the central hub of the spinner 28 is provided at its top end with a disk-shaped element 66 disposed perpendicularly to the axis ZZ', thereby imparting a T-shape to the top portion of the spinner. The disk 66 includes two peripheral recesses in which the magnets 62a and 62b are installed, which magnets form the driving portion of the magnetic coupling drive system 60. The disk thus constituting a magnet carrier is disposed in the housing 54 formed by the top wall 42. The shaft 44 is provided with other magnets 64a and 64b at its end that penetrates into the housing 50 of the wall 48. These magnets 64a and 64b form the driven portion of the magnetic coupling drive system 60. In this way, the two pair of permanent magnets are separated from each other by walls 42 and 48.

The magnetic coupling drive system is, for example, of the repulsive type, i.e. the magnets in each pair are magnetized in the same direction parallel to the axis of the spinner 28 while the magnetizations of the two pairs of magnets are in opposite directions.

It is also possible to provide a magnetic coupling drive system of the attractive type, e.g. including facing rings each formed by magnetized portions and for each of said rings two magnetized portions disposed side by side are magnetized in opposite directions.

In such magnetic coupling drive systems, the driving portion sets up a magnetic field gradient which in turn generates forces on the driven portion, thereby enabling the driving portion to drive the driven portion at a speed that is identical to its own speed.

The magnetic protection device 70 of the invention serves specifically to reduce the magnetic field gradient due to an external magnetic field at the magnetic coupling drive system 60 of the water meter so that the above-mentioned motion and force transmission are not disturbed.

Figure 4:
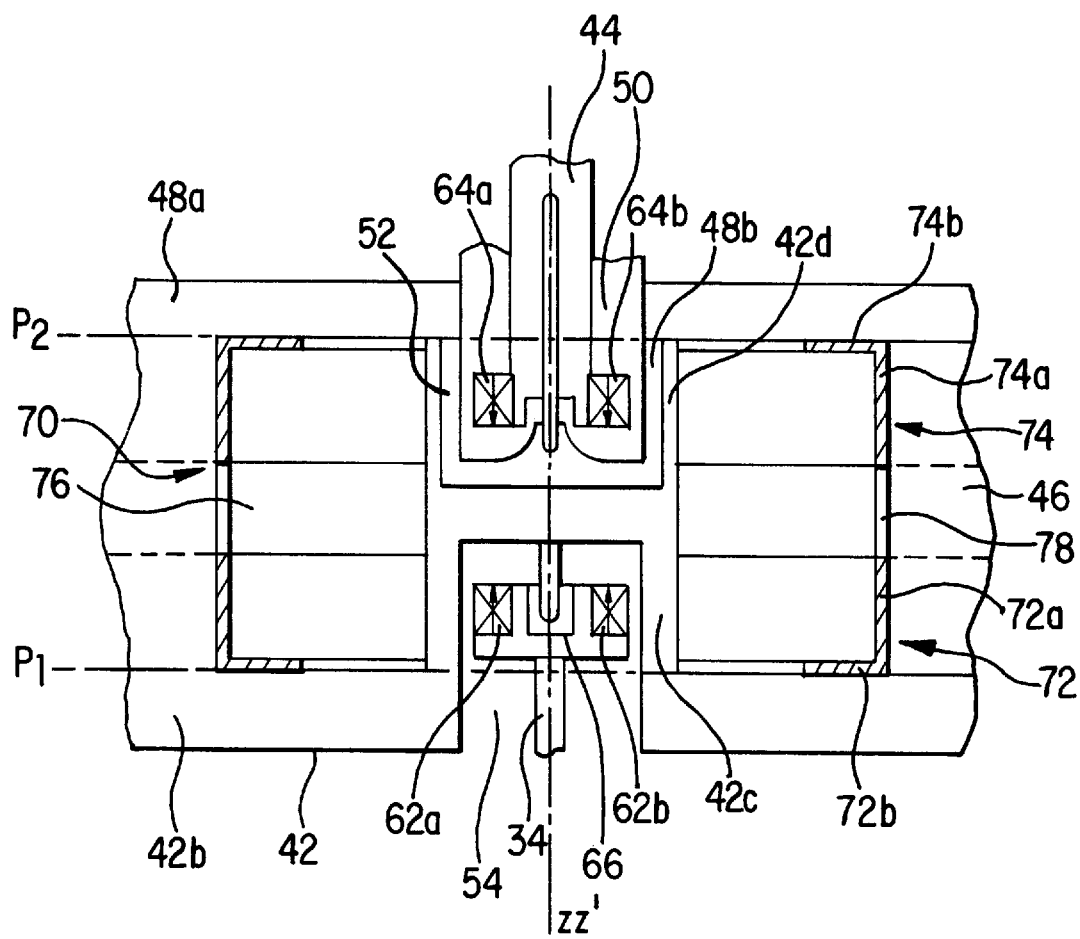
FIG. 4 is a fragmentary diagrammatic view on a larger scale showing the water meter fitted with the FIG. 3 magnetic protection device.

In a first embodiment shown in FIGS. 3 and 4, the magnetic protection device comprises two parts 72 and 74 made of magnetic material and disposed around the magnetic coupling drive system 60 in the annular-shaped space of the additional chamber 46. The two parts 72 and 74 are identical and they are circularly symmetrical about the axis of rotation.

Each of the parts 72 and 74 has a minimum radial extent that is greater than the radial extent of the permanent magnets 62a & 62b and 64a & 64b. As shown in FIG. 4, each part 72 and 74 comprises two portions: a first portion 72a or 74a which is cylindrical in shape and which extends parallel to the axis ZZ', and a second portion 72b or 74b which is annular in shape, and which extends radially towards the axis ZZ' from one of the axial ends of the corresponding first portion.

The annularly-shaped second portion 72b, 74b constitutes a flange. In the magnetic protection device of the invention, the two parts 72 and 74 are offset axially, i.e. they leave an axial gap 76 between them located in the annular space of the additional chamber 46. In FIG. 4, two geometrical planes P1 and P2 are marked parallel to each other and perpendicular to the axis ZZ'. The plane P1 is tangential to the bottom face of the flange 72b of the part 72 while the plane P2 is tangential to the top face of the flange 74b of the part 74. The top face of the wall 42 is contained in the plane P1 while the bottom face of the wall 48 is contained in the plane P2.

As a result, the part 72 is in contact with the top face of the wall 42 while the part 74 is in contact with the bottom face of the wall 48.

The two parts 72 and 74 of magnetic material extend radially in such a manner as to bracket the two pairs of magnets 62a & 62b and 64a & 64b in an axial direction, and planes P1 and P2 are tangential neither to the bottom face of the magnets 62a & 62b nor to the top face of the magnets 64a & 64b, as is the case in the prior art protection device. To maintain an axial space 76 between these two parts 72 and 74, provision is made, for example, to dispose a cylindrically-shaped spacer 78 made of non-magnetic material between the first portions 72a and 74b of each part 72 and 74.

To keep the parts 72 and 74 centered, it is possible to provide a plurality of abutments 80 disposed radially on the corresponding top (or bottom) face of the wall 42 (or of the wall 48) as can be seen in FIG. 3.

It is also possible to secure each of the parts 72 and 74 by using adhesive to secure its respective annular flange 72b or 74b to the top face (or the bottom face) of the wall 42 (or of the wall 48) so as to avoid the need for additional elements as constituted by the spacers 78 and the abutments 80.

The magnets 62a & 62b and 64a & 64b constituting the magnetic coupling drive system of the water meter are situated, by virtue of the axial space between the two parts 72 and 74, in a zone where the gradient set up by the external magnetic field is considerably reduced. In addition, the magnets are also protected from the intensity of an external magnetic field.

By adapting the axial extent of the axial space 76 and also the axial extent of the parts 72 and 74 to the magnetic coupling drive system, it is thus possible to improve the effectiveness of the magnetic protection device of the invention while cancelling the magnetic field gradient in the zone where said magnetic coupling drive system is situated.

The two parts of magnetic material are given dimensions that are a function of the intensity of the magnetic field established by the permanent magnets so as to reduce as far as possible any magnetic interactions between said parts and said magnets. As a result, the dimensions given thereto require the parts to be positioned a particular way in three dimensions relative to the magnets, and it is advantageous to place the parts of magnetic material at a distance such that the magnetic field created at said parts by the magnets has an intensity not greater than $10^{-3}$ Teslas.

If the parts are too remote from the magnetic coupling drive system, and therefore closer to the outside walls of the meter, there remains a danger of the magnetic material constituting the parts 72 and 74 saturating and consequently of the magnetic protection device losing effectiveness because of its own proximity relative to the external magnetic field source.

It should be observed that when the magnetic coupling drive system is of the repulsive type, the magnetic field lines extend further both radially and axially than they do when the system is of the attractive type.

A second embodiment of the invention is shown in FIG. 5. The water meter shown in part in this figure includes an additional chamber 47 that is annular in shape and that is defined by the two walls 42 and 48.

Everything mentioned above while describing the first embodiment remains applicable and is therefore not repeated below, and in particular the references in the figures remain unchanged for items that are the same.

However, in this embodiment, the two parts 72 and 74 made of magnetic material are disposed on respective opposite sides of the wall 48 made of non-magnetic material.

One of the parts, 72, is housed in the additional chamber 47 and is fixed, e.g. by adhesive, to the top face of the wall 42 which is shown in part.

The other part 74 is disposed in the enclosure 24 for the totalizing counter and it is in contact with the top face of the wall 48 via the free edge of its first portion 74*a*.

The part 74 is held radially by a collar 82 surrounding said part 74 and bearing against a peripheral abutment 84.

When disposed in this way, the parts 72 and 74 leave an axial space 76 between them and their axial extent is such as to encompass axially the permanent magnets 62*a* & 62*b* and 64*a* & 64*b* of the magnetic coupling drive system.

As shown in FIG. 5, the top magnets 64*a* and 64*b* are larger than the bottom magnets 62*a* and 62*b* and they penetrate in part into the axial space 76 whereas said magnets 62*a* and 62*b* remain outside said axial space. The zone in which the magnets are situated corresponds to a zone of reduced magnetic field that does not affect the magnetic interactions between said magnets in the presence of an eternal magnetic field.

This disposition for the parts of the magnetic protection device is particularly advantageous compared with the prior art magnetic protection device shown in FIGS. 1 and 2, given that the axial extent of the additional chamber 47 is reduced, thereby obtaining greater compactness.

By way of example, the magnetic moment of the top magnet 64*a* and 64*b* is $16+10^{-9}$ Tm$^{-3}$ while that of the bottom magnets 62*a* and 62*b* is $11+10^{-9}$ Tm$^{-3}$.

The parts 72 and 74 are made of soft iron.

The outside diameter of the parts 72 and 74 is 38 mm, while their inside diameter is 28 mm, with said parts having a thickness of 1 mm.

The first portion 72*a* or 74*b* of each of the parts has an axial extent or "height" of 8.5 mm.

Each magnet has the same diameter and is situated at a distance of 8.25 mm from the inside diameter of the annular flange 72*b* or 74*b* of the corresponding part.

The top face of each magnet 64*a* or 64*b* is situated at a distance of 5.5 mm from the bottom face of the annular flange 74*b*.

The bottom face of each magnet 62 is situated at a distance of 2.7 mm from the bottom face of the annular flange 72*b*.

In the above disposition, the magnetic field created by the magnets 64*a* and 64*b* at the part 74 has an intensity of $10^{-3}$ Teslas, thereby avoiding any magnetic interaction.

FIG. 6 serves to compare the effectiveness of the magnetic protection device of the invention as shown in FIG. 5 with the prior art magnetic protection device as shown in FIGS. 1 and 2.

In this figure, curve A gives the appearance of the magnetic field gradient in the zone occupied by a magnetic coupling drive system of a water meter fitted with the magnetic protection of FIGS. 1 and 2 in the presence of an external magnetic field, and curve B shows the appearance of the magnetic field gradient in the zone occupied by a magnetic coupling drive system in the water meter fitted with the magnetic protection device of FIG. 5 in the presence of the same external magnetic field.

Thus, the magnetic coupling drive system provided with the magnetic protection device shown in FIG. 5 lies in a zone (between dashed vertical parallel lines) where the magnetic field gradient (curve B) is considerably smaller than the magnetic field gradient (curve A) obtained using the prior art magnetic device (of FIGS. 1 and 2). Only the magnetic drive magnets 62*b* and 64*b* together with a fraction of the parts 72 and 74 of the magnetic protection device are shown in FIG. 6. The magnetic coupling drive system as protected by the magnetic detection device of FIG. 5 is consequently quite insensitive to external magnetic disturbances.

In a variant of the invention shown in FIG. 7*a*, where only the parts 92 and 94 made of magnetic material and the magnetic coupling drive system are shown, each part made of magnetic material is in the form of a hemispherical ring. The two parts 92 and 94 are identical and their axial extent is such that they encompass the magnetic coupling drive system in the axial direction.

FIG. 7*b* shows another variant of the magnetic protection device of the invention. In this figure, the two parts 96 and 98 made of magnetic material are identical, with each part 96 (or 98) being built up of two parallel cylindrical portions 96*a* and 96*b* (or 98*a* and 98*b*) of the axial extent and that are coaxial, being held together by an annular third portion 96*c* (or 98*c*) uniting the cylindrical portions via their edges that are furthest from the axial space 76.

Locally, in section in any plane containing the axis ZZ', each of the parts 96 and 98 is U-shaped.

With such a disposition, it is preferable for the parts 96 and 98 to be remote from the magnets 62*a*, 62*b*, 64*a*, and 64*b* so as to avoid magnetic interactions that are too strong.

FIG. 7*c* shows yet another variant using the parts 72 and 74 of magnetic material as described with reference to FIG.

4, but in which said parts have differing dimensions. As shown in this figure, the part 72 is of smaller radial extent than is the part 74.

The configuration could equally well be the other way around: the part 74 could then have a smaller radial extent than the part 72.

Such asymmetrical configurations can be used when the magnets are of different sizes, and in particular in a magnetic coupling drive system of the attractive type, constituted, for example, by magnetized rings situated facing each other.

It is also possible to provide for using two parts made of magnetic material which are quite difference in shape, e.g. by combining, in non-limiting manner, the shapes described with reference to FIGS. 4, 5 and 7a to 7c, together with the corresponding dimensions.

It is also possible to make the magnetic protection device of the invention by using any other shape for the parts made of magnetic material, and not described in the present description.

We claim:

1. A fluid meter comprising a measurement chamber and an enclosure containing a totalizing counter separating by at least one wall made of non-magnetic material, and axial spinner situated in said measurement chamber being immersed in said fluid, and a shaft in coaxial alignment with said spinner and mechanically connected to said totalizing counter, a rotary drive system magnetically coupling together the axial spinner and the shaft of the counter and comprising at least two axially magnetized elements comprising two parts of magnetic material which are secured respectively to said axial spinner and to said shaft of the totalizing counter, characterized in that said fluid meter includes a protection device for protecting said drive system against an external magnetic field and includes an additional wall cooperating with at least one wall in contact with the enclosure to define an additional chamber disposed between the enclosure and the measurement chamber, wherein the two parts of magnetic material are situated in the additional chamber and are separated from each other.

2. A fluid meter according to claim 1, characterized in that the two parts (72, 74; 92, 94; 96, 98) made of magnetic material of the protection device are separated from each other by one of the walls (42, 48).

3. A fluid meter according to claim 1, characterized in that the two parts (72, 74; 92, 94; 96, 98) made of magnetic material of the protection device (70) are separated from each other by both walls (42, 48).

4. The fluid meter of claim 1 wherein each of said two parts of magnetic material surrounding said drive system has a minimum radial extent greater than the radial extent of the magnetized elements of said drive system, the two parts of magnetic material leaving between them an axial space so as to reduce the gradient of the external magnetic field at the drive system and having an axial extent such that said two parts of magnetic material encompass said drive system axially.

* * * * *